(12) United States Patent
Jordan et al.

(10) Patent No.: US 6,540,309 B1
(45) Date of Patent: Apr. 1, 2003

(54) FAULT TOLERANT ELECTRONIC BRAKING SYSTEM

(75) Inventors: Mark John Jordan, Netherburn (GB); Mark Maiolani, Glasglow (GB); Andreas Both, Munich (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/744,410
(22) PCT Filed: Jul. 15, 1999
(86) PCT No.: PCT/EP99/05042
§ 371 (c)(1),
(2), (4) Date: Jul. 6, 2001
(87) PCT Pub. No.: WO00/05116
PCT Pub. Date: Feb. 3, 2000

(30) Foreign Application Priority Data

Jul. 20, 1998 (GB) .............................................. 9815790

(51) Int. Cl.[7] .............................................. B60T 13/66
(52) U.S. Cl. ................ 303/122.07; 303/20; 303/DIG. 9
(58) Field of Search ............................. 303/20, DIG. 9, 303/122.04, 122.05, 122.07

(56) References Cited

U.S. PATENT DOCUMENTS 4,629,257 A * 12/1986 Brauninger ............. 303/DIG. 9
5,810,454 A * 9/1998 Prinzer et al. ................. 303/20

* cited by examiner

Primary Examiner—Matthew C. Graham
(74) Attorney, Agent, or Firm—Robert L. King; Kim-Marie Vo

(57) ABSTRACT

A fault tolerant electronic braking system for a vehicle has a brake pedal arranged to provide an electronic signal in response to operation thereof. A number of braking nodes are coupled to the brake pedal, each node being arranged to control a brake actuator. Each brake node has a controller arranged for processing the first signal to provide a second signal for controlling the brake actuator, and for providing third signals for transmission to the other control means. The third signals are the expected second signal results of the other controllers. Each controller is arranged to compare the second signal with the third signals received from the other controllers such that errors detected between the second and third signals indicate faults in the controllers.

12 Claims, 1 Drawing Sheet

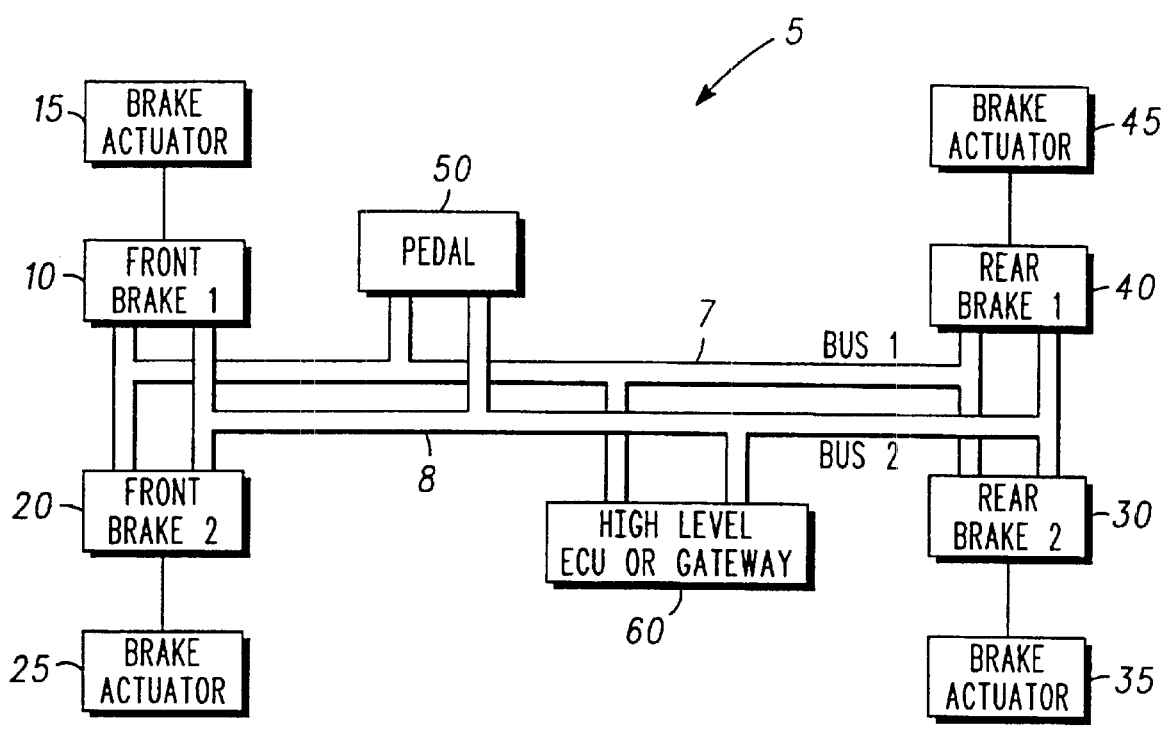

FAULT TOLERANT ELECTRONIC BRAKING SYSTEM

FIELD OF THE INVENTION

This invention relates to fault-tolerant electronic braking systems.

BACKGROUND OF THE INVENTION

In recent years, automobile manufacturers have sought to replace many expensive mechanical components with electronic components. Future automotive designs contemplate the removal of even more mechanical components, particularly in respect of control linkages to the engine, wheels, etc., replacing them with 'by-wire' technology, partially derived from the 'fly-by-wire' technology associated with the aircraft industry.

For example, the hydraulic or mechanical braking system of an automobile may be replaced by a microprocessor controlled system, having a pedal which, upon actuation by the driver, transmits electronic signals to brake actuators located in proximity to the brakes. The brake actuators apply the brakes in dependence upon the electronic signals.

In safety critical applications, such as the brake system described above, the system must be fault-tolerant, such that if a fault should occur, at least some functionality of the system will continue. Known arrangements to provide fault-tolerance include redundant systems having two or more microprocessors which operate independently of each other and cross-check each other to detect faults.

A problem with this arrangement is that the larger the number of processors, the more cost is added to the system, and the fewer the number of processors, the greater the chances of all processors in the system developing a fault.

This invention seeks to provide a fault-tolerant electronic braking system which mitigates the above mentioned disadvantages.

SUMMARY OF THE INVENTION

According to the present invention there is provided a fault-tolerant electronic braking system for a vehicle, comprising: a user operated input arranged to provide a first signal in response to operation thereof; and, at least three braking nodes coupled to the user operated input, each node being arranged to control at least one brake actuator, each node having control means arranged for processing the first signal to provide a second signal for controlling the at least one brake actuator, and to provide a plurality of third signals to the at least two other control means, the third signals being expected second signal results of the at least two other control means; wherein each control means is arranged to compare the second signal with the third signals received from the at least two other control means such that errors detected between the second and third signals indicate faults in the at least three control means.

Preferably upon detection of a fault, each control means uses a voting scheme to determine which of the second and third signals is to be used as a fourth signal to control each of the brake actuators.

Each control means is also preferably arranged to transmit the fourth signal to the at least two other control means, in order to verify whether the voting scheme has been used correctly.

The at least three brake nodes are preferably distributed in mutually remote locations the vehicle. Preferably the first signal is adapted such that it is transmitted to the at least three brake nodes in a synchronous manner.

The first signal is preferably re-transmitted by each of the control means, for further fault detection. Preferably the at least three brake nodes comprise four brake nodes, each arranged to control one of four brake actuators.

In this way a fault-tolerant electronic braking system is provided which is cost effective, with improved fault-tolerance and enhanced fault-detection.

BRIEF DESCRIPTION OF THE DRAWING

An exemplary embodiment of the invention will now be described with reference to the single FIGURE drawing which shows a preferred embodiment of a fault-tolerant electronic braking system in accordance with the invention.

DETAILED DESCRIPTION OF A PREFERRED EMBODIMENT

Referring to the single FIGURE drawing, there is shown a fault-tolerant electronic braking system 5 for a vehicle (not shown), including first, second, third, and fourth wheel nodes having electronic control units (ECUs) 10, 20, 30 and 40, which are distributed in mutually remote locations of the vehicle. Each of the first, second, third, and fourth ECUs 10, 20, 30 and 40, are coupled to associated first, second, third and fourth brake actuators 15, 25, 34, 45 respectively.

The first, second, third, and fourth ECUs 10, 20, 30 and 40 respectively are also each coupled to first and second buses 7 and 8 respectively. The brake pedal unit 50 (shown as Pedal) is also connected to the first and second buses 7 and 8 respectively. The first and second buses 7 and 8 respectively are substantially identical and are both arranged to provide synchronous signals according to a Time Division Multiple Access scheme (TDMA) or similar.

High level functions of current braking systems may be integrated into the system 5 via a (high level) ECU 60 attached to the buses 7 and 8, or by a gateway to an ECU (not shown).

The brake pedal unit 50 has a transducer (not shown) and is arranged to provide first electronic signals to the first and second buses 7 and 8 respectively in response to a conventional force applied to a brake pedal (not shown) of the unit 50. The brake pedal unit 50 may be arranged to pre-process the signals.

Each of the first, second, third, and fourth ECUs 10, 20, 30, 40, can operate independently from the other ECUs if required, and are able to provide a processed result signal to the associated brake actuator 15, 25, 35 or 45 in response to the first signals received from the brake pedal unit 50. In this way a basic braking function is achieved, which is the minimum required for safe operation, not necessarily including higher level functions such as vehicle stability management or traction control. The provision of first and second buses 7 and 8 provides fault-tolerance in the case of a problem occurring therein.

In addition, each of the first, second, third, and fourth 10, 20, 30, 40, ECUs, performs a similar algorithm using the same first signals received from the brake pedal unit 50, and provides the first signals and the result signals to the other ECU's. In this way each of the first, second, third, and fourth ECUs 10, 20, 30, 40, can detect incorrect operation by comparing its received first signals and result signals with those of the other ECUs.

As four ECUs are available to check data against, it is possible to not only detect that there is a problem somewhere in the system 5, but also to identify the faulty ECU. A faulty ECU can therefore be identified, either by itself, or by the majority of the ECUs in the system 5 via a voting procedure, whereby the ECU having the most different results compared to the other ECUs is considered to be faulty.

After a fault has been identified, appropriate action can be taken, such as logging the fault, running diagnostics, or resetting or disabling the node. If an ECU is disabled due to a fault, the system 5 can be arranged such that the main braking function will be re-distributed across the operating ECUs.

As each ECU checks its operation against the other ECUs, faults can be detected that may be undetectable by using a simpler self-test type of checking in isolation. For example, an ECU may exhibit a fault where it decodes the received signals from the brake pedal unit 50 incorrectly, but the decoded value is still within the allowed range. The ECU would pass a self-test, and act on the faulty data if no other tests were performed, but with the described checking against other ECUs, the incorrect data would be detected.

As each ECU regularly re-transmits their received signals, the system 5 is able to survive faults that would otherwise cause it to be partially disabled.

For example, if the first ECU 10 cannot access the electronic signals from the brake pedal unit 50 directly due to a communications fault, it can use the electronic signals passed via the second, third or fourth ECUs 20, 30 and 40 respectively.

An advantage gained from this layout is that identical signals from the brake pedal unit 50 is available to all parts of the system 5 at the same time. This simplifies the error-detection task, as when correctly operating, all ECUs can perform identical operations on identical signals, and any differences indicate a fault.

It will be appreciated that alternative embodiments to the one described above are possible. For example, a single rear brake ECU could be used to replace the third and fourth ECUs 30 and 40, whereby the single rear brake ECU would be coupled to the third and fourth brake actuators 35 and 45 respectively.

What is claimed is:

1. A fault tolerant electronic braking system for a vehicle, comprising:

a user operated input arranged to provide a first signal in response to operation thereof; and, at least three braking nodes coupled to the user operated input, each node being arranged to control at least one brake actuator, each node having control means arranged for processing the first signal to provide a second signal for controlling the at least one brake actuator, and to provide a plurality of third signals to the at least two other control means, the third signals being the second signal results of the at least two other control means; wherein each control means is arranged to compare the second signal with the third signals received from the at least two other control means such that errors detected between the second and third signals indicate faults in the at least three control means.

2. The system of claim 1 wherein the first signal is re-transmitted by each of the control means, for further fault detection.

3. The system of claim 1 wherein the at least three brake nodes comprise four brake nodes, each arranged to control one of four brake actuators.

4. The system of claim 1 wherein the at least three brake nodes are disttibuted in mutually remote locations of the vehicle.

5. The system of claim 4 wherein the first signal is adapted such that it is transmitted to the at least three brake nodes in a synchronous manner.

6. The system of claim 4 wherein the first signal is re-transmitted by each of the control means, for further fault detection.

7. The system of claim 4 wherein the at least three brake nodes comprise four brake nodes, each arranged to control one of four brake actuators.

8. The system of claim 4 wherein the at least three brake nodes comprise four brake nodes, each arranged to control one of four brake actuators.

9. The system of claim 4 wherein the at least three brake nodes comprise four brake nodes, each arranged to control one of four brake actuators.

10. The system of claim 1 wherein the first signal is adapted such that it is transmitted to the at least three brake nodes in a synchronous manner.

11. The system of claim 10 wherein the at least three brake nodes comprise four brake nodes, each arranged to control one of four brake actuators.

12. The system of claim 10 wherein the at least three brake nodes comprise four brake nodes, each arranged to control one of four brake actuators.

* * * * *